United States Patent
Taira et al.

(10) Patent No.: US 9,887,511 B2
(45) Date of Patent: Feb. 6, 2018

(54) PASSIVE Q-SWITCH LASER DEVICE

(71) Applicant: INTER-UNIVERSITY RESEARCH INSTITUTE CORPORATION NATIONAL INSTITUTES OF NATURAL SCIENCES, Mitaka-shi, Tokyo (JP)

(72) Inventors: Takunori Taira, Okazaki (JP); Arvydas Kausas, Okazaki (JP); Lihe Zheng, Okazaki (JP)

(73) Assignee: INTER-UNIVERSITY RESEARCH INSTITUTE CORPORATION NATIONAL INSTITUTE OF NATURAL SCIENCES, Mitaka-Shi (JP)

( * ) Notice: Subject to any disclaimer, the term of this patent is extended or adjusted under 35 U.S.C. 154(b) by 0 days.

(21) Appl. No.: 15/401,251

(22) Filed: Jan. 9, 2017

(65) Prior Publication Data
US 2017/0201061 A1    Jul. 13, 2017

(30) Foreign Application Priority Data
Jan. 8, 2016  (JP) ................................ 2016-002667

(51) Int. Cl.
*H01S 3/11* (2006.01)
*H01S 3/0941* (2006.01)
*H01S 3/16* (2006.01)

(52) U.S. Cl.
CPC .......... *H01S 3/1115* (2013.01); *H01S 3/0941* (2013.01); *H01S 3/1611* (2013.01); *H01S 3/1643* (2013.01)

(58) Field of Classification Search
CPC ..... H01S 3/1115; H01S 3/1643; H01S 3/0941
See application file for complete search history.

(56) References Cited

U.S. PATENT DOCUMENTS

2003/0138005 A1*   7/2003   Kan ........................ H01S 3/113
                                                                372/25

FOREIGN PATENT DOCUMENTS

| JP | 2003-086873 A | 3/2003 |
|----|---------------|--------|
| JP | 2003-198019 A | 7/2003 |

OTHER PUBLICATIONS

Zheng, Lihe et al., "">MW peak power at 266 nm, low jitter kHz repetition rate from intense pumped microlaser", Optics Express, Dec. 12, 2016, vol. 24, No. 25, pp. 28748-28761.

* cited by examiner

*Primary Examiner* — Dung Nguyen
(74) *Attorney, Agent, or Firm* — Oliff PLC (57) ABSTRACT

Provided is a passive Q-switch laser device possessing a power density controller (15) making power density of excitation light from an excitation light source (14) equal to or greater than power density so that delay time required for reaching oscillation after start of excitation of a laser gain medium (12) becomes equal to or shorter than a laser upper energy level lifetime of the laser gain medium (12).

3 Claims, 5 Drawing Sheets

Fig. 7

PASSIVE Q-SWITCH LASER DEVICE

TECHNICAL FIELD

The present invention relates to a passive Q-switch laser device that would generate laser light with a high power and a short pulse by using a Q-switching technology.

BACKGROUND ART

Further research and developments of laser devices directed to achieve a higher power, a shorter pulse, and a shorter wavelength of output light have been made. Among the aforementioned devices, a Q-switch laser device using a Q-switching technology has received a lot of attention from where output pulse laser light with a high power and a short pulse could be obtained. In the Q-switching technology, with a configuration including not only a gain medium but also a Q-switch element in a resonator, the laser oscillation is controlled by a varied Q-value of the resonator determined by the Q-switch element laser oscillation, thereby the output laser light with a short pulse and a high power could be provided.

Various kinds of Q-switching technologies have been known. Among the aforementioned technologies, a passive Q-switching laser technology using a saturable absorber as a Q-switch element is more preferable in terms of a simple and compact configuration of a laser device than the other Q-switching technologies. The saturable absorber absorbs less incident light power when the incident light power gets increased. The saturable absorber absorbs the incident light when the power of the incident light is equal to or less than an absorption saturation threshold value. When the power of incident light reaches or is higher than the saturation absorption threshold value of the saturable absorber, the saturable absorber turns in to a transparent one. Using such features, the saturable absorber is used as the Q-switch element.

Specifically, the passive Q-switch laser device using the saturable absorber as the Q-switch element operates in a manner described below. Upon excitation of the gain medium, atoms are excited to a laser upper level of the gain medium. The excited atoms remain at the laser upper energy level during a laser upper energy level life time period τ and then transit to a laser lower energy level after the life time τ followed by fluorescence emission. Population inversion of the gain medium is initially small at the start of the excitation of the saturable absorber, thus the fluorescence intensity emitted from the gain medium and incident power on the saturable absorber is small. Therefore, the saturable absorber is not transparent initially at the start stage of the excitation of the gain medium, and the Q-value of the resonator is small, resulting in no laser oscillation. Since the gain medium is continuously excited even during a period in which the Q-value of the resonator is small and the laser oscillation does not occur, the population inversion of the gain medium gradually increases leading to gradually increased the power of the fluorescence emitted from the gain medium and incident on the saturable absorber. Finally upon excess of the power of the fluorescence emitted from the gain medium and incident on the saturable absorber over the absorption saturation threshold value of the saturable absorber, the absorption by the saturable absorber abruptly decreases and the saturable absorber becomes transparent. Meanwhile, the Q-value of the resonator is increased, and the induced emission is abruptly promoted in the gain medium. As a result of aforementioned process, laser oscillation occurs. However, the induced emission is promoted at once due to the excessively high gain. The accumulated population inversion is consumed in short time leading to automatically end of the oscillation in short time. Thus, the pulse laser light possessing a high power and a short pulse is generated from the resonator.

Various kinds of gain media as well as various kinds of excitation units that excite the gain medium, are known. For example, an Nd:YAG crystal is used as the gain medium, and a semiconductor laser light source is used as the excitation unit for exciting the gain medium through excitation light irradiation. In this case, the excitation light from the semiconductor laser light source is applied to the Nd:YAG crystal which is served as the gain medium. Nd ions contained in the gain medium are excited to an upper level, thereby causing population inversion (for example, see Japanese Laid-Open Patent Publications Nos. 2003-86873 and 2003-198019).

SUMMARY OF INVENTION

Technical Problem

The passive Q-switch laser device combining semiconductor laser excitation and the aforementioned passive Q-switching technique is preferable in terms of the simple and compact configuration. Moreover, the passive Q-switch laser device can be made compact as a whole due to a short resonator length which is also preferable in terms of outputting short pulse laser.

In the aforementioned conventional passive Q-switch laser device which could generate an output thereof to megawatts ($10^6$ W) or above by using semiconductor laser (LD) excitation, LD light having a low power is temporally compressed through Q-switching operation in a solid laser and accumulated energy is oscillated at once in short time to thereby obtain a high peak value. To further increase output energy, a widened laser oscillation area is proposed where naturally strong excitation is required. However, upon the strong excitation, heat effects accompanying the excitation process become serious. Thus, the serious heat problem should be suppressed by reducing an oscillation repetition frequency to approximately 100 Hz and by carrying out pulse excitation numbers corresponding to the repetition frequency. In this case, a larger oscillation mode could provide a higher output power, provided that a sectional area of the excitation light is widened and a pump pulse duration is equal to or greater than approximately a half of the laser upper energy level lifetime during when the excitation energy is accumulated. However, the excitation efficiency deteriorates in this case due to natural emission which could result in increased jitter of delay time as required for laser oscillation.

Since large jitter of the delay time is required for reaching the laser oscillation, synchronization with an external controller or an external measurement device becomes difficult. For example, when the passive Q-switch laser device is connected to a mass spectroscopy imaging (MSI) system, a focusing ion beam (FIB) is applied to a sample, where the Q-switch laser light is applied to spattered particles to thereby perform ionization for the purpose of achieving efficient, mass analysis. However, the Q-switch laser light should synchronously be applied in the process when the particles are spattered. When the jitter of the delay time required for reaching the laser oscillation is large, timing is not synchronized leading to reduction of ionization rate.

In view of above described the problems, the present invention has been made, with an object to provide a passive Q-switch laser device with high excitation efficiency and a small jitter of delay time required for reaching the laser oscillation.

Solution to Problem

A passive Q switch laser device of the present invention that was made to address the aforementioned object includes: an input mirror element and an output mirror element forming a resonator; a laser gain medium being arranged inside the resonator; a saturable absorber being arranged inside the resonator; an excitation light source exciting the laser gain medium; and a power density controller making power density of excitation light, from the excitation light source equal to or greater than power density so that delay time required for reaching laser oscillation after start of the excitation of the laser gain medium becomes equal to or shorter than a laser upper energy level lifetime of the laser gain medium.

Since the power density controller is provided which makes the power density of the excitation light from the excitation light source equal to or greater than the power density so that the delay time required for reaching the Q-switch oscillation after the start of the excitation of the laser gain medium becomes equal to or shorter than the laser upper level lifetime of the laser gain medium, excitation efficiency is high and a jitter of the delay time required for reaching the Q-switch oscillation is small.

In the passive Q switch laser device described above, the power density controller includes either or both of a driving power source adjusting a power of the excitation light from the excitation light source and an optical system (lens pairs or single lens, a waveguide, or a reflector element) adjusting a diameter of a focusing spot of the excitation light from the excitation light source in the laser gain medium.

In the present specification, the "delay time required for reaching Q-switch oscillation after start of the excitation of the laser gain medium" refers to "practical excitation time considering a resonator lifetime" and thus "excitation time required for reaching Q-switch oscillation after start of the excitation".

Advantageous Effects of Invention

The power density controller is provided which makes the power density of the excitation light from the excitation light source equal to or greater than the power density so that the delay time required for reaching the Q-switch oscillation after the start of the excitation of the laser gain medium (the practical excitation time considering the resonator lifetime) becomes equal to or shorter than the laser upper energy level lifetime of the laser gain medium, so that the excitation efficiency is high and the jitter of the delay time required for reaching the Q-switch oscillation is small.

DESCRIPTION OF EMBODIMENTS

Hereinafter, modes for implementing the present invention will be described in detail with reference to the accompanying drawings.

Embodiment

Figure 1:
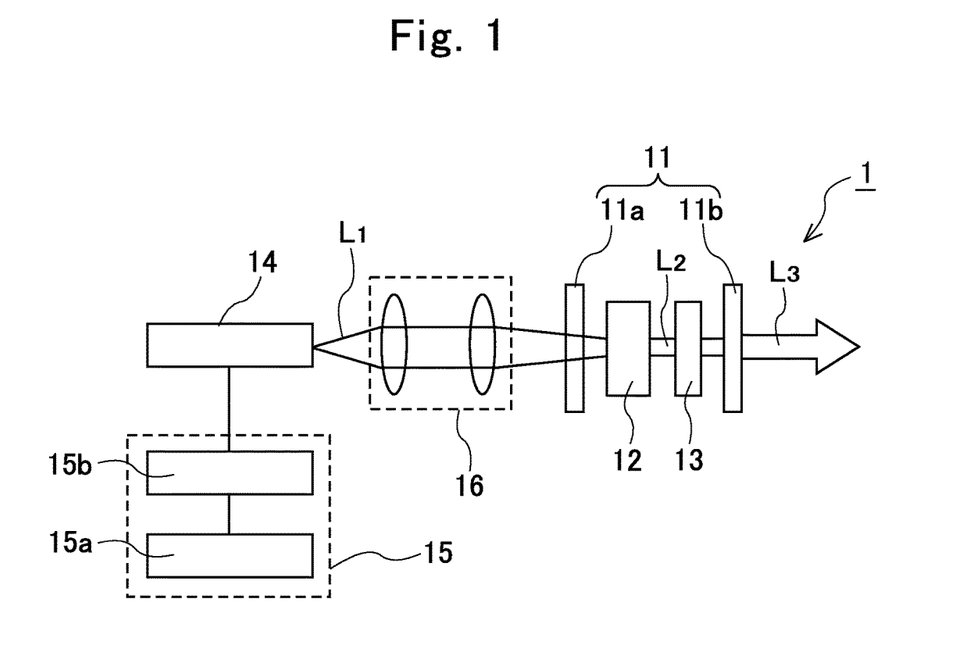
FIG. 1 is a schematic configuration diagram of a passive Q-switch laser device according to an embodiment of the present invention.

A passive Q-switch laser device 1 according to the embodiment of the present invention includes, as illustrated in FIG. 1, an input mirror element 11a and an output mirror element 11b forming a resonator 11; a laser gain medium 12 arranged inside the resonator 11; a saturable absorber 13 arranged inside the resonator 11; an excitation light source 14 that excites the laser gain medium 12; and a power density controller 15 that makes power density of excitation light from the excitation light source 14 equal to or greater than power density so that delay time required for reaching oscillation after start of the excitation of the laser gain medium 12, that is, oscillation start time ($t_s$) becomes equal to or shorter than a laser upper energy level lifetime of the laser gain medium 12.

The input mirror element 11a is formed by, for example, evaporating a dielectric multilayer film to a quartz glass or BK7 plate, and transmits excitation light L1 from the excitation light source 14 therethrough at high transmittance and reflects, at high reflectance, light L2 emitted from the laser gain medium 12. The output mirror element 11b is also formed by, for example, evaporating a multilayer film to a quartz glass or BK7 plate, and transmits part of the induced emission light L2 therethrough and reflects a remaining part thereof. Light L3 transmitted through the output mirror element 11b and outputted to the outside turns into laser oscillation light.

The laser gain medium 12 and the saturable absorber 13 are provided for a resonance optical path of the resonator 11. In the present embodiment, the saturable absorber 13 is inserted between the laser gain medium 12 and the output mirror element 11b, but may be inserted between the input mirror element 11a and the laser gain medium 12. Further, the input mirror element 11a may directly be evaporated to an excitation side of the laser gain medium 12 and the output mirror element 11b may directly be evaporated to an output side of the saturable absorber 13. The laser gain medium 12 and the saturable absorber 13 may be directly bonded to each other to be integrated and form a monolithic structure.

For the laser gain medium 12, atoms are excited to a laser upper energy level as a result of incidence of the excitation light L1 extracting from the excitation light source 14 and remain at the upper level for almost an upper energy level lifetime, which leads to a state of population inversion (the number of atoms at the upper energy level is greater than the number of atoms at a lower energy level), thereby forming a gain (amplified) medium. Transition of the atoms from the upper energy level to the lower energy level results in emission of fluorescence L2.

The saturable absorber 13 serves as a Q-switching element, which absorbs light L2 emitted from the laser gain medium 12. Afterwards the saturable absorber 13 becomes highly transmissive for the light L2 as a result of high-speed shift of intensity of the light L2 between an absorbed and saturated state due to an increasement of the accumulated population inversion.

The excitation light source 14 is driven by a driving power from a power supply source 15, and emits the excitation light L1 of a wavelength that can excite the laser gain medium 12. The excitation light L1 emitting from the excitation light source 14 is applied to the laser gain medium 12 via an optical system 16 and the input mirror 11a.

The power supply source 15 includes a control section 15a and a driving circuit 15b. The control section 15a controls the driving circuit 15b to thereby control power density of the excitation light of the laser gain medium 12 resulting from the irradiation of the excitation light L1 emitted from the excitation light source 14. Through the control performed by the control section 15a of the driving power source 15, the power density of the excitation light L1 applied to the laser gain medium 12 is made equal to or greater than power density so that delay time ($t_s$) required for reaching oscillation after start of the excitation of the laser gain medium 12 becomes equal to or less than a laser upper energy level lifetime, $\tau$ of the laser gain medium 12.

As described above, in the present embodiment, the power density of the excitation light L1 is controlled by the driving power source 15, but the power density of the excitation light L1 also varies depending on a diameter of an irradiation spot of the excitation light L1, so that the control section 15a of the driving power source 15 can be dispensed with. In other words, the excitation light source driven by the driving circuit 15b to emit the excitation light L1 with a predetermined power. The diameter of the irradiation spot may be controlled by the optical system 16 to make the power density of the excitation light L1 equal to or greater than the power density so that excitation time ($t_s$) required for reaching oscillation from the start of the excitation of the laser gain medium 12 becomes equal to or shorter than the laser upper energy level lifetime $\tau$ of the laser gain medium 12.

The laser gain medium 12 is, for example, an Nd:YAG crystal, and the laser upper energy level lifetime $\tau$ is approximately 230 μs (where the dopant concentration of Nd ions in YAG is 1 at. %). In this case, preferably used as the excitation light source 14 is a light source that efficiently emits the excitation light L1 with a wavelength around 808 nm that can excite, at a laser upper energy level, Nd atoms in the laser gain medium 12. A laser diode is preferable applied for such a light source.

In a case the laser gain medium 12 is a Nd:YAG crystal, a wavelength of the light L2 emitted from the laser gain medium 12 is around 1.06 μm, and thus a $Cr^{4+}$:YAG crystal is a preferable choice a the saturable absorber 13.

In the present embodiment, the quartz glass plate is used for the input mirror 11a and a gap is provided between the input mirror 11a and the Nd:YAG crystal 12. In this case, the interface for the incidence of the light L2 in the resonator 11 becomes larger, and results in higher loss. To reduce the loss, the incidence interface should be reduced, and therefore a coating as an input mirror may directly be laminated on the Nd:YAG crystal 12. As a result, the interfaces could be reduced from 6 to 4.

To further reduce the interface, a coating as an output mirror may directly be laminated on the $Cr^{4+}$:YAG crystal 13. As a result, the interface is reduced to 2. Bonding together the Nd:YAG crystal 12 and the $Cr^{4+}$:YAG crystal 13 can set the interface at 0. Note that, for a bonding interface, there are two possible cases: direct bonding; and bonding after performing coating.

The light L2 emitted from the laser gain medium 12 is incident on the saturable absorber 13. In case the intensity of the light L2 cannot surpass the absorption and saturation of the saturable absorber 13, the saturable absorber 13 strongly absorbs the light L2 leading to high loss of the resonator 11 and a small Q-value. As a result, Q-switch oscillation cannot start. When the intensity of the light L2 become strong to such an extent that surpasses the absorption and saturation of the saturable absorber 13, the absorption of the saturable absorber 13 is saturated. Thereafter the saturable absorber 13 turns to be transparent results in lower loss of the saturable absorber 13 and higher Q-value. As a result, the Q-switch oscillation starts. Through the Q-switch oscillation, the Q-switch laser light L3 emits from the output mirror element 11b to the outside.

Figure 2A:
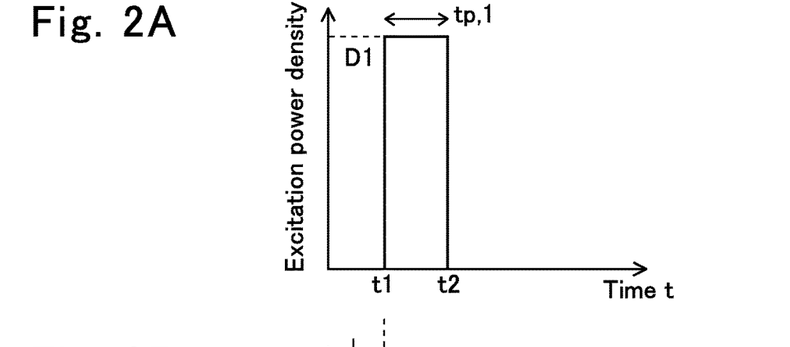
FIG. 2A illustrates operation of the passive Q-switch laser device according to the embodiment, with a temporal change in power density of excitation light applied to a laser gain medium which comes from an excitation light source as controlled by a control section.
Figure 2B:
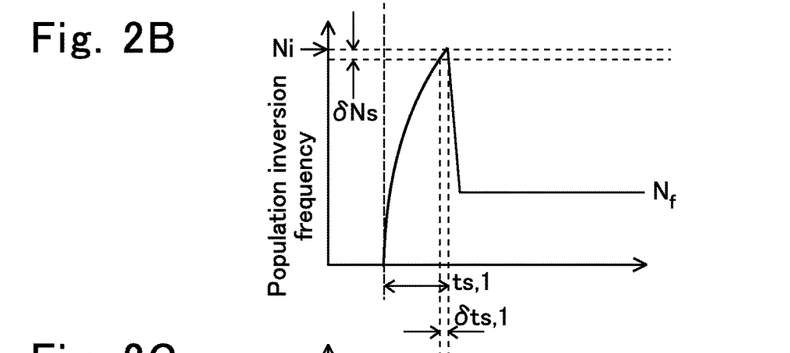
FIG. 2B illustrates a temporal change in the number of atoms at a laser upper energy level of the laser gain medium.
Figure 2C:
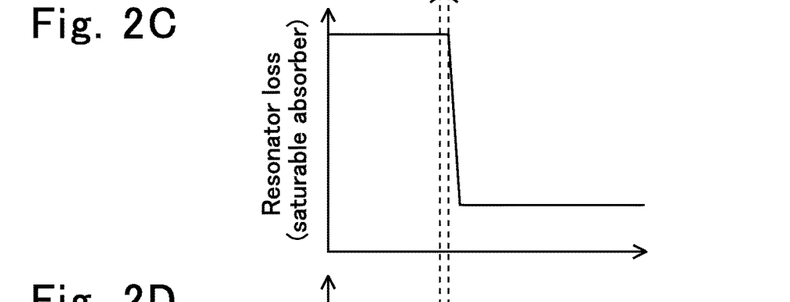
FIG. 2C illustrates a temporal change in an absorption coefficient of a saturable absorber.
Figure 2D:
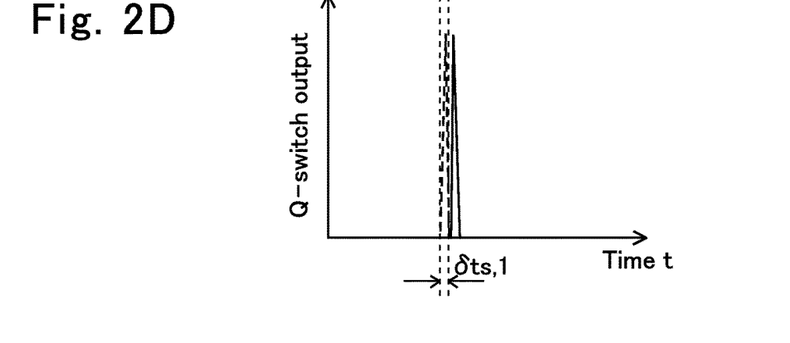
FIG. 2D illustrates a temporal change in intensity of laser light transmitted through an output mirror element and outputted to the outside of a resonator.

Next, operation of the passive Q-switch laser device of the present embodiment will be described. FIG. 2A illustrates the operation of the passive Q-switch laser device of the present embodiment, with a temporal change in the power density of the excitation light L1 applied, to the laser gain medium 12 which emits from the excitation light source 14 as controlled, by the control section 15a. FIG. 2B illustrates a temporal change in the number of atoms (population inversion) at the laser energy upper level of the laser gain medium 12. FIG. 2C illustrates a temporal change of absorption coefficient (resonator loss) in the saturable absorber 13. FIG. 2D illustrates a temporal change in intensity (Q-switch output) of the laser light L3 transmitted through the output mirror element 11 and emitted to the outside of the resonator 11.

D1 in FIG. 2A denotes power density, $\delta t_{s,\,1}\;(=t_{s,\,1}-t_1)$ is delay time, which is required for reaching oscillation before the end of the excitation of the laser gain medium 12 at ending time $t_2$ after starting thereof at staring time $t_1$ (excitation time $t_{p,\,1}=t_2-t_1$), becomes equal to or lower than the laser upper energy level lifetime $\tau$ of the laser gain medium 12 depends on the applied power density. Note that time when the Q-switching is started under excitation condition with the power density $D_1$ is defined as $t_{s,\,1}$.

As illustrated in FIG. 2B, upon the excitation with the power density D1 of the excitation light as described in FIG. 2A, the number of atoms at the laser upper energy level continuously increases from the excitation starting time $t_1$, until reaching the population inversion Ni where abrupt saturation in the saturable absorber is caused. Along with the accumulated population inversion $N_i$, an abrupt induced emission is increased, resulting in rapid occurrence of laser light. On the other hand, the induced emission following the abrupt pulse occurrence is far more intensive when compared with that of population inversion caused by the excitation, thus the population inversion quickly decreases even the excitation still continues. Then the oscillated laser light firstly increases continuously until the population inversion frequency gradually decreases to an oscillation threshold level. After that, the laser light further decreases till the threshold value. The laser light still continues using the accumulated population inversion, but finally ends. In conclusion, the pulse oscillation is performed through the process described above, where the population inversion upon ending of this pulse is usually defined as $N_f$.

FIG. 2C illustrates how resonator loss occurs in a passive Q-switch laser. Note that time required for starting the Q-switching is defined as $t_{s,\,1}$.

In the passive Q-switch laser device 1 of the present embodiment, the power density of the excitation light is made equal to the power density so that the excitation (delay) time $\delta t_{s,\,1\_}$ $(=t_{s,\,1}-t_1)$ for reaching the oscillation after the start of the excitation of the laser gain medium 12 at $t_1$ is almost equal to the laser upper energy level lifetime τ of the laser gain medium 12. Thus the increase extent of the population inversion, as well as the fluorescence intensity also increases. When the fluorescence intensity increases fast to a certain value at time $t_2$, the saturable absorber 13 absorbs the fluorescence from gain media 12 and reaches saturation. Therefore, even when the components 11, 12, 13, 14, and 15 forming the passive Q-switch laser device 1 fluctuates (even when a phenomenon leading to variation $\delta N_s$ when $N_s$ occurs), a jitter of the delay time required for reaching the Q-switch oscillation is small. Moreover, the operation of Q-switch oscillation continues while a decrease in the number of atoms at the upper energy level is small and the time is equal to or lower than a fluorescence lifetime at the excitation period. Thus the loss related to the excitation could be reduced, resulting in an improvement in the oscillation efficiency.

Next, the aforementioned operation of the passive Q-switch laser device 1 according to the present embodiment will be compared with operation of a passive Q-switch laser device of Comparative Example. FIGS. 3A to 3D illustrate the operation of the passive Q-switch laser device of Comparative Example. A configuration of the passive Q-switch laser device of Comparative Example is almost the same as that of the passive Q-switch laser device 1 according to the embodiment. However, the passive Q-switch laser device of Comparative Example differs from the passive Q-switch laser device 1 of the embodiment in a temporal change in power density of excitation light emitted from an excitation light source and applied to a laser gain medium.

Figure 3A:
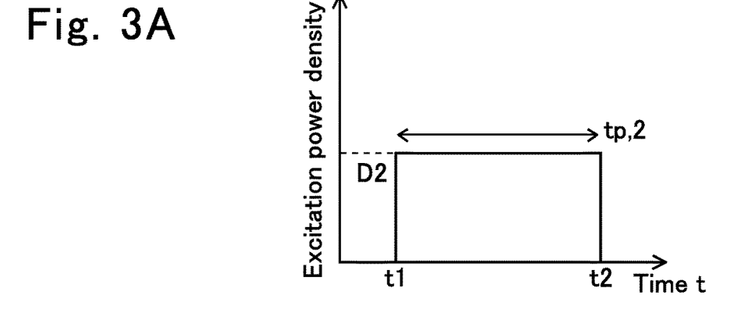
FIG. 3A illustrates an operation of a passive Q-switch laser device according to Comparative Example, with a temporal change in power density of excitation light applied to a laser gain medium which comes from an excitation light source.
Figure 3B:
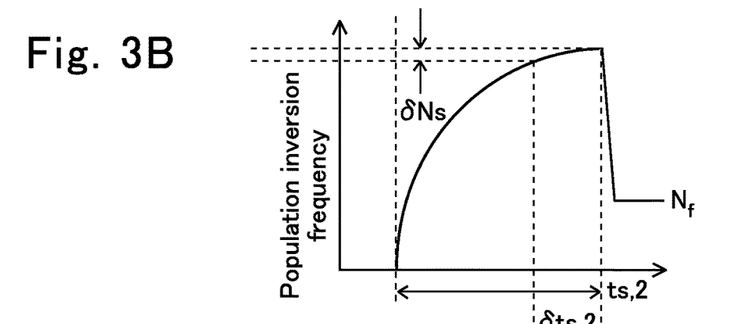
FIG. 3B illustrates a temporal change in the number of atoms at a laser upper energy level of the laser gain medium and a temporal change in fluorescence intensity.
Figure 3C:
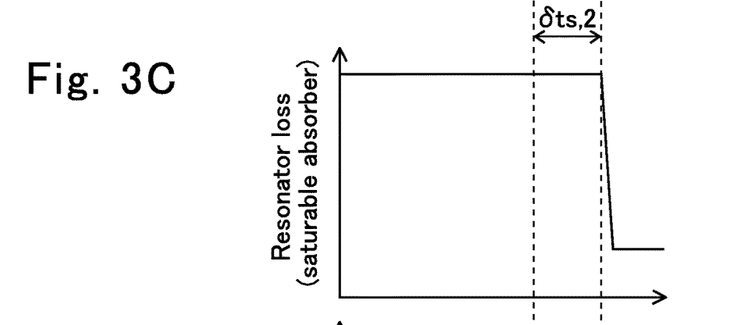
FIG. 3C shows a temporal change in an absorption coefficient of a saturable absorber.
Figure 3D:
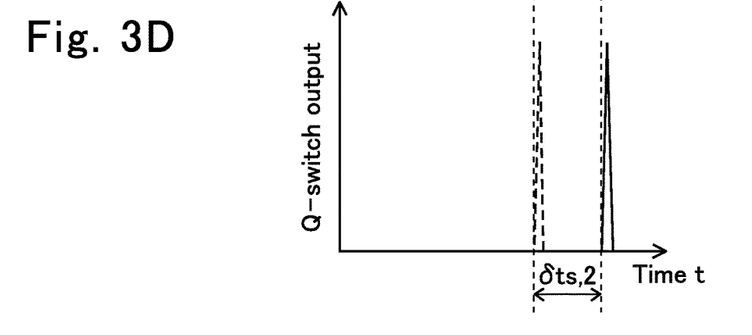
FIG. 3D shows a temporal change in intensity of laser light emitting to the outside of a resonator.

FIG. 3A illustrates the temporal change in the power density of the excitation light emitted from the excitation light source and applied to the laser gain medium. FIG. 3B illustrates a temporal change in the number of atoms at a laser upper energy level of the laser gain medium and a temporal change in fluorescence intensity. FIG. 3C illustrates a temporal change in an absorption coefficient (resonator loss) of a saturable absorber. FIG. 3D illustrates a temporal change in intensity of laser light emitted to the outside of the resonator.

In Comparative Example, the power density of the excitation light is $D_2$ ($<D_1$), as illustrated in FIG. 3A. Therefore, absorption saturation of the saturable absorber starts around time $t_{s,\,2}$ ($>t_{s,\,1}$) when Q-switching starts, as illustrated in FIG. 3B. As a result, Q-switch laser light is emitted, as illustrated in FIGS. 3C and 3D.

In case of passive Q-switch operation, population inversion density N is related to excitation time t based on a rate equation as expressed in formula (1).

$$N = \frac{W_p \tau N_{tot}}{W_p \tau} \left[ 1 - \exp\left\{-(W_p \tau + 1)\frac{t}{\tau}\right\}\right] \cong W_p \tau N_{tot}\left(1 - e^{-\frac{t}{\tau}}\right) \quad (1)$$

In formula (1) $W_p$ denotes a rate from which the population inversion is increased by the excitation, and $N_{tot}$ denotes the number of rare-earth ions dopant per unit volume. It is assumed that population inversion density required for the start of the Q-switch oscillation is $N_s$ and start time is $t_s$. Following formula (1), the population inversion is expressed by formula (2).

$$N_s = W_p \tau N_{tot}\left(1 - e^{-\frac{t_s}{\tau}}\right) \quad (2)$$

And thus formula (3) could be obtained.

$$t_s = \tau \ln\left(\frac{\frac{W_p \tau N_{tot}}{N_s}}{\frac{W_p \tau N_{tot}}{N_s} - 1}\right) \quad (3)$$

Here, $W_p$ is proportional to the excitation density D, and thus excitation density dependence of start time variation δts in Q-switching is defined by formula (4).

$$\delta t_s = \frac{\tau}{1-a} \cdot \frac{\delta D}{D} \quad (4)$$

Note that $a = W_p \tau N_{tot}/N_s$. The phenomenon could be illustrated qualitatively as shown in FIG. 4, by combined consideration of both, FIG. 2B and FIG. 3B.

Figure 4:
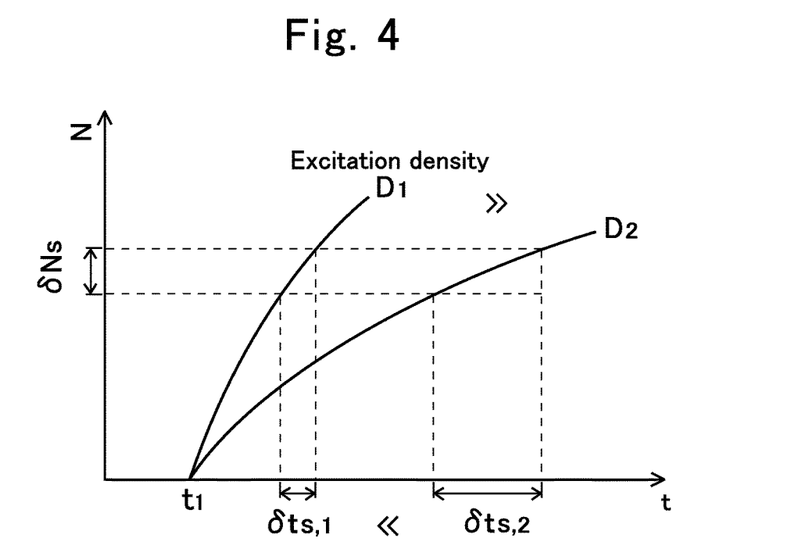
FIG. 4 is a graph qualitatively illustrating a temporal change in population inversion.

A vertical axis of FIG. 4 denotes the population inversion density N and a horizontal axis thereof represents time t. In case of D1 that has high excitation density, the population inversion rapidly increases upon the start of the excitation time $t_1$. On the other hand, in case of $D_2$ that has lower excitation density, the population inversion slowly increases upon the start of the excitation at $t_1$. As a result, in a case where fluctuation of the population inversion density $\delta N_s$ required for starting the Q-switching oscillation is $\delta t_{s,\,1}$, fluctuation of the time where the Q-switching started is $\delta t_{s,\,1}$ for the excitation density $D_1$ and $\delta t_{s,\,2}$ ($>>\delta t_{s,\,1}$) for the excitation density $D_2$. As a result, a jitter of the delay time required for reaching the Q-switching oscillation is lower upon the fluctuation of the components forming the passive Q-switch laser device as shown in Comparative Example.

On the other hand, based on formula (1), excitation efficiency with respect to time $t_p$ is obtained by formula (5).

$$\eta(t_p) = \frac{1}{W_p \tau + 1} \cdot \frac{1 - \exp\left\{-(W_p \tau + 1)\frac{t_p}{\tau}\right\}}{t_p/\tau} \cong \frac{1 - \exp\left(-\frac{t_p}{\tau}\right)}{t_p/\tau} \quad (5)$$

Figure 5:
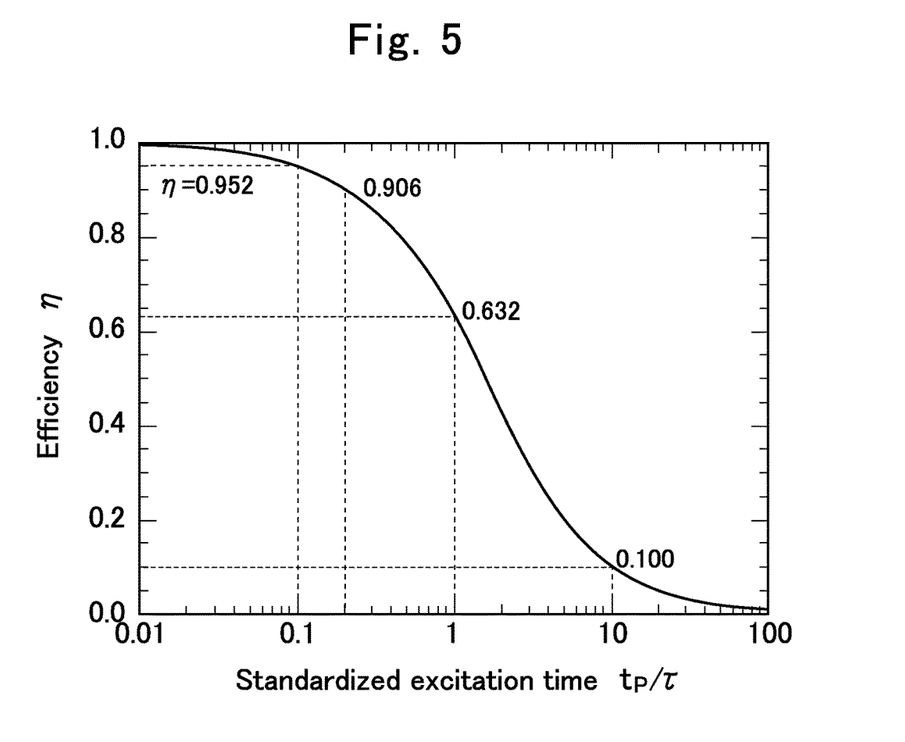
FIG. 5 is a graph illustrating relationship between excitation efficiency and excitation time.

FIG. 5 illustrates the efficiency by standardized excitation time according to formula (5). A vertical line in FIG. 5 represents efficiency n and a horizontal axis therein represents standardized excitation time $t_p/\tau$ ($t_p=t_s-t_1$). FIG. 5 indicates that a curve of efficiency improvement becomes gentle starting from the point $t_p=\tau$. It is proved that an excitation pulse width needs to be made shorter than the fluorescence lifetime.

Specifically, in the passive Q-switch laser device 1 according to the present embodiment, excitation is performed with the power density of the excitation light L1 from the excitation light source 14, i.e., while more intensive excitation density than excitation density $D_\tau$ is required for obtaining a given output as designed in a case where an excitation time width of the laser gain medium 12 is defined as the upper energy level lifetime ($\tau$), thereby providing a smaller jitter of the delay time required for the Q-switch oscillation even upon the fluctuation of the components 11, 12, 13, 14, and 15 in the passive Q-switch laser device 1.

Further, the Q-switch oscillation is performed while a decrease in the number of atoms at the upper energy level is small. Followed by a reduced loss caused by natural emission, the oscillation efficiency could be enhanced.

Next, a verification experiment, will be described.

(Verification Experiment) Through the description of the operation of the passive Q-switch laser device 1 according to the embodiment, a mechanism has been indicated. The power density of the excitation light from the excitation light source is equal to or higher than the power density so that the delay time required for reaching the Q-switch oscillation after the start of the excitation of the laser gain medium becomes equal to or shorter than the laser upper energy level lifetime of the laser gain medium. A higher excitation efficiency and a smaller jitter of the delay time required for reaching the Q-switch oscillation is obtained. Therefore, the verification experiment was performed although it is unnecessary.

Figure 6:
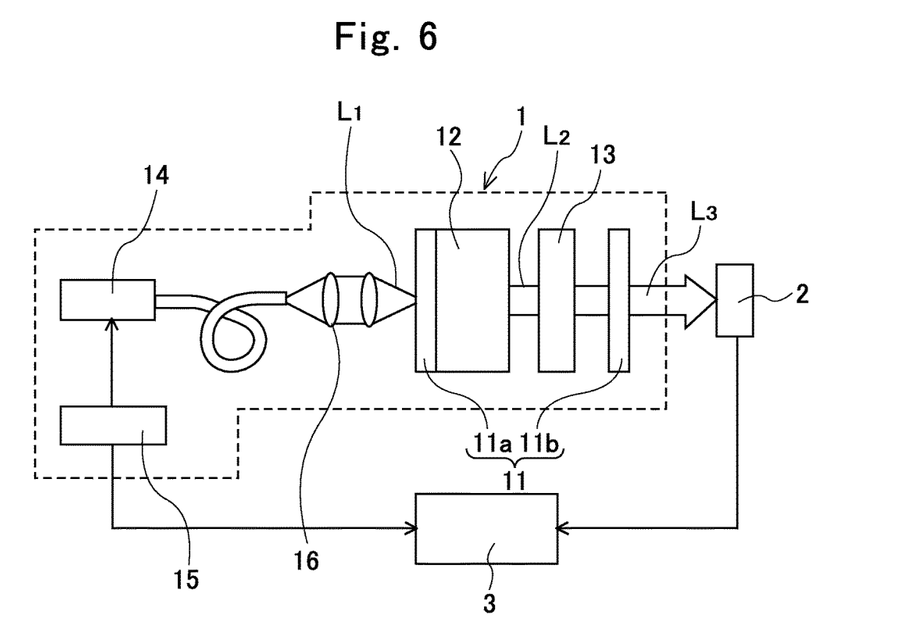
FIG. 6 is a schematic configuration diagram of a verification experimental device.

FIG. 6 illustrates an outline of the versification experiment. Component surrounded by a dotted line in FIG. 6 forms the passive Q-switch laser device 1 according to the present invention. Numeral 2 denotes a photodiode and numeral 3 denotes an oscilloscope.

The input mirror 11a is a [100]-cut YAG crystal sized 3 mm×3 mm×1 mm, and has a dielectric multilayer film formed on a outer surface thereof for reflecting light with a wavelength of 1064 nm at high reflectance and transmitting light with a wavelength of 808 nm therethrough at high transmittance. The output mirror element 11b is a quartz glass plate, and has, on an inner surface thereof, a dielectric multilayer film formed to 50% reflection and 50% transmission light with a wavelength of 1064 nm.

The laser gain medium 12 laminated on the inner surface of the YAG crystal 11a is a [100]-cut YAG crystal sized 3 mm×3 mm×4 mm with an 1.1 at % dopant of $Nd^{3+}$ ions. A composite YAG/Nd:YAG sized 3 mm×3 mm×5 mm and having the Nd:YAG 12 on the YAG 11a is produced by HG Optronics Inc.

The saturable absorber 13 arranged between the laser gain medium 12 and the output mirror element 11b is a [110]-cut $Cr^{4+}$:YAG crystal sized 3 mm φ×4 mm and has an antireflection film formed on both surfaces thereof for not reflecting light with a wavelength of 1064 nm. The $Cr^{4+}$:YAG crystal is produced by Scientific Materials Co.

The excitation light source 14 is a fiber-coupled 400 W LD. The fiber has a core diameter of 600 μm and an numerical aperture (N.A.) of 0.22. The LD 14 generates laser light with a central wavelength of 808 nm at 1 kHz.

The verification experiment was performed by using the laser light L1 from the LD 14 with a spot diameter of 1.1 mm after the lens system 16 and controlling a driving current of the LD 14 by the power density controller 15. Thereby the power density of the excitation light L1 could be modulated.

Figure 7:
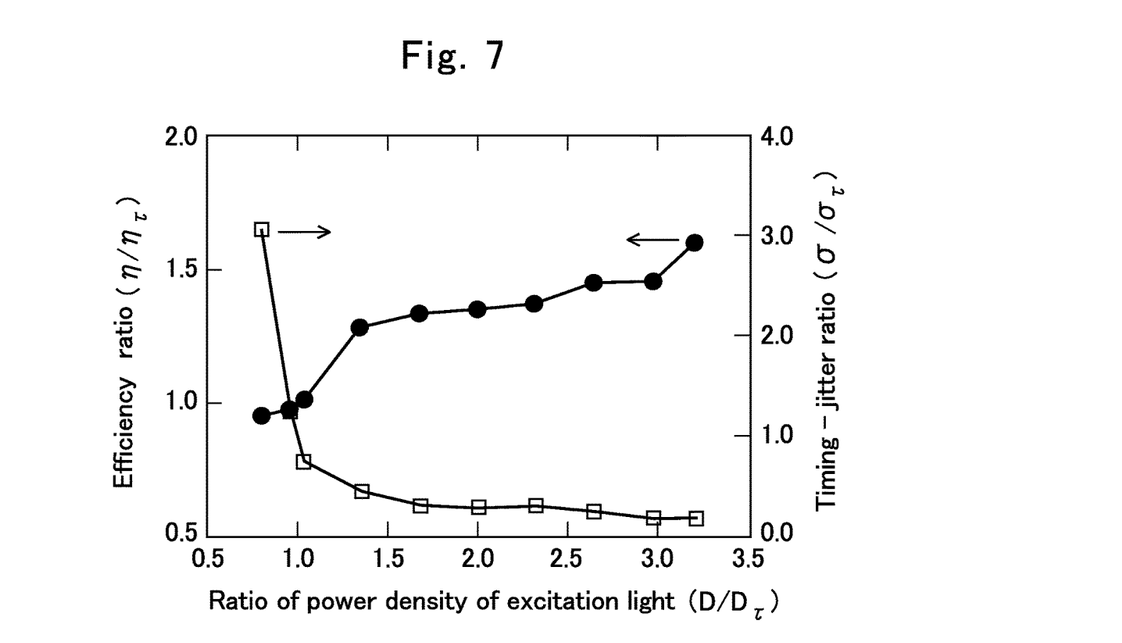
FIG. 7 is a graph illustrating relationship between power density of excitation light, a jitter, and excitation efficiency.

Table 1 and FIG. 7 illustrate the measurement results of standardization efficiency of the passive Q-switch laser with respect to a standardized excitation density ratio where an excitation power density $D_\tau$ of 12.9 kW/cm² is used for obtaining an output energy $E_o$ (3 mJ here) at an excitation pulse width the same as that of laser upper energy level lifetime ($\tau$). A standardized timing jitter of a Q-switch laser output with respect to the electric signal from the LD 14.

TABLE 1

| Peak power of LD14 W | Pulse width of LD14 $t_p$ (μs) | Standarized excitation time $t_p/\tau$ | Excitation energy mJ | Excitation power density D (kW/cm²) | Ratio of power density of excitation light $D/D_\tau$ | Excitation efficiency η (%) | Excitation efficiency ratio $\eta / \eta_\tau$ | Standard deviation of timing jitter 2σ (ns) | Timing-jitter ratio $\sigma/\sigma_\tau$ |
|---|---|---|---|---|---|---|---|---|---|
| 400 | 56 | 0.2434783 | 22.4 | 41.36 | 3.20 | 22.83765 | 1.604737837 | 65 | 0.16688 |
| 370 | 63 | 0.273913 | 23.31 | 38.25 | 2.96 | 20.57978 | 1.446083622 | 69 | 0.17715 |
| 330 | 70 | 0.3043478 | 23.1 | 34.12 | 2.64 | 20.54709 | 1.443786587 | 91 | 0.23363 |
| 290 | 80 | 0.3478261 | 23.2 | 29.98 | 2.32 | 19.47506 | 1.368458035 | 119 | 0.30552 |
| 250 | 102 | 0.4434783 | 25.5 | 25.85 | 2.00 | 19.1904 | 1.348455773 | 108 | 0.27728 |
| 210 | 110 | 0.4782609 | 23.1 | 21.71 | 1.68 | 18.96018 | 1.332278857 | 116 | 0.29782 |
| 170 | 150 | 0.6521739 | 25.5 | 17.58 | 1.36 | 18.27375 | 1.284045339 | 172 | 0.44159 |
| 130 | 220 | 0.9565217 | 28.6 | 13.44 | 1.04 | 14.48762 | 1.018004566 | 289 | 0.74198 |
|  | 230 | 1 |  | 12.92 | 1.00 | 14.23139 | 1 | 389.5 | 1 |
| 120 | 280 | 1.2173913 | 33.6 | 12.41 | 0.96 | 13.97516 | 0.981995434 | 490 | 1.25802 |
| 100 | 340 | 1.4782609 | 34 | 10.34 | 0.80 | 13.59611 | 0.95536065 | 1191 | 3.05777 |

Symbol $\tau$ in Table 1 is equal to an upper level life time of 230 μs of the used laser gain medium 12. Symbol $D\tau$ in Table 1 denotes excitation power density when a pulse width is $\tau$ (=230 μs), which is equal to 12.92 kW/cm². Symbol $\eta_\tau$ is equal to an efficiency of 14.23139 when the pulse width is $\tau$ (=230 μs). A vertical axis of FIG. 7 represents standardization efficiency ($\eta/\eta_\tau$) and a standardization timing jitter (t/$\tau$) and a horizontal axis thereof represents a standardization excitation density ratio ($D/D_\tau$).

Table 1 and FIG. 7 prove that, in a case where the excitation density is set at a value higher than $D_\tau$, the delay time required for reaching the Q-switch oscillation after the start of the excitation is sequentially shortened and the efficiency is improved (an improvement from 14% to 23%). It is also proved that the jitter abruptly shortens at a more intensive excitation density. Take a few data for example here. The jitter value is approximately 0.5 μs at a half value of the excitation density $D_\tau$, and that is 195 ns when the excitation density reaches $D_\tau$, while gradually approaches 35 ns as the excitation density increases therefrom. In conclusion, a higher excitation density than $D_\tau$ when operating a passive Q-switch laser, could permits an achievement of higher efficiency and a lower jitter of the passive Q-switch laser device.

This is also confirmed with another laser material ND:YVO$_4$ (with an upper energy level lifetime $\tau$=84 µs) and the same effects can be expected with materials other than the Yb:YAG.

Priority is claimed on Japanese application No. 2016002667, filed Jan. 8, 2016, the content of which is incorporated herein by reference.

The invention claimed is:

1. A passive Q-switch laser device, comprising:
    an input mirror element and an output mirror element forming a resonator;
    a laser gain medium being arranged inside the resonator;
    a saturable absorber being arranged inside the resonator;
    an excitation light source exciting the laser gain medium; and
    a power density controller making power density of excitation light from the excitation light source equal to or greater than power density so that delay time required for reaching oscillation after start of the excitation of the laser gain medium becomes equal to or lower than a laser upper energy level lifetime of the laser gain medium.

2. The passive Q-switch laser device according to claim 1, wherein
    the power density controller includes either or both of a driving power source aiming for adjusting a power of the excitation light from the excitation light source and an optical system aiming for adjusting a suitable spot diameter of the excitation light from the excitation light source in the laser gain medium.

3. A passive Q-switch laser device, comprising:
    an input mirror element and an output mirror element forming a resonator;
    a laser gain medium being arranged inside the resonator;
    a saturable absorber being arranged inside the resonator;
    an excitation light source exciting the laser gain medium; and
    a power density controller controlling a power density D of excitation light from the excitation light source, wherein
    the power density controller controls the power density D which satisfies the following formula (1)

$$D/D\tau > 1 \qquad (1)$$

wherein "D$\tau$" represents an excitation density required for obtaining an output when an excitation time width of the laser gain medium is defined as a laser upper energy level lifetime "$\tau$" of the laser gain medium.

* * * * *

UNITED STATES PATENT AND TRADEMARK OFFICE
CERTIFICATE OF CORRECTION

PATENT NO. : 9,887,511 B2
APPLICATION NO. : 15/401251
DATED : February 6, 2018
INVENTOR(S) : Takunori Taira et al.

Page 1 of 1

It is certified that error appears in the above-identified patent and that said Letters Patent is hereby corrected as shown below:

In the Claims
At Column 12, Line 21, change "$D/D\tau > 1$" to --$D/D\tau \geq 1$--.

Signed and Sealed this
Twenty-fourth Day of September, 2019

Andrei Iancu
*Director of the United States Patent and Trademark Office*